United States Patent
Voigt et al.

(10) Patent No.: US 10,684,954 B2
(45) Date of Patent: Jun. 16, 2020

(54) PAGE CACHE ON PERSISTENT MEMORY

(71) Applicant: HEWLETT PACKARD ENTERPRISE DEVELOPMENT LP, Houston, TX (US)

(72) Inventors: Douglas L. Voigt, Boise, ID (US); Meng Zou, Fremont, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 277 days.

(21) Appl. No.: 15/507,204

(22) PCT Filed: Apr. 2, 2015

(86) PCT No.: PCT/US2015/024159
§ 371 (c)(1),
(2) Date: Feb. 27, 2017

(87) PCT Pub. No.: WO2016/160027
PCT Pub. Date: Oct. 6, 2016

(65) Prior Publication Data
US 2017/0308479 A1    Oct. 26, 2017

(51) Int. Cl.
*G06F 12/0893*    (2016.01)

(52) U.S. Cl.
CPC .. *G06F 12/0893* (2013.01); *G06F 2212/1016* (2013.01)

(58) Field of Classification Search
CPC ............... G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88;
(Continued)

(56) References Cited

U.S. PATENT DOCUMENTS 6,202,124 B1    3/2001    Kern et al.
6,321,233 B1    11/2001   Larson
(Continued)

FOREIGN PATENT DOCUMENTS

CN    101490651 A    7/2009
CN    102483714 A    5/2012
(Continued)

OTHER PUBLICATIONS

How it Works: Intel SSD Caching; Bach, Matt; Puget Systems, Jun. 29, 2012; retrieved from https://www.pugetsystems.com/labs/articles/How-it-Works-Intel-SSD-Caching-148/ on Feb. 7, 2019 (Year: 2012).*
(Continued)

*Primary Examiner* — Daniel C. Chappell
(74) *Attorney, Agent, or Firm* — Trop, Pruner & Hu, P.C.

(57) ABSTRACT

Various examples described herein provide for caching a page on persistent memory for memory-mapped access of a file from a non-persistent memory file system or a remote file system having a non-persistent memory page cache. In particular, some examples detect memory-mapped access of a file from a non-persistent memory file system or a remote file system having a non-persistent memory page cache and, based on availability of persistent memory, caches a page associated with the memory-mapped access on the persistent memory.

19 Claims, 7 Drawing Sheets

(58) Field of Classification Search
CPC ...... G06F 2003/0691–0698; G06F 2009/3883;
G06F 2009/45562–45595; G06F
2201/00–885; G06F 2206/00–20; G06F
2209/00–549; G06F 2211/00–902; G06F
2212/00–7211; G06F 2213/00–4004;
G06F 2216/00–17; G06F 2221/00–2153;
G11C 15/00–06; G11C 16/00–3495;
G11C 17/00–18
See application file for complete search history.

(56) References Cited

U.S. PATENT DOCUMENTS

| | | | |
|---|---|---|---|
| 6,473,845 | B1 | 10/2002 | Hornung et al. |
| 6,691,245 | B1 | 2/2004 | DeKoning |
| 6,741,366 | B2 | 5/2004 | Ishikawa et al. |
| 6,901,481 | B2 | 5/2005 | Olson |
| 7,032,228 | B1 | 4/2006 | McGillis et al. |
| 7,222,348 | B1 | 5/2007 | Athreya et al. |
| 7,281,104 | B1 | 10/2007 | Tsypliaev et al. |
| 7,644,239 | B2 | 1/2010 | Ergan et al. |
| 8,174,520 | B2 | 5/2012 | Lin |
| 8,219,758 | B2 | 7/2012 | Wang et al. |
| 8,260,841 | B1 | 9/2012 | Maity |
| 8,266,407 | B2 | 9/2012 | Karamcheti et al. |
| 8,527,693 | B2 | 9/2013 | Flynn et al. |
| 8,898,417 | B1 | 11/2014 | Post et al. |
| 9,223,686 | B1* | 12/2015 | Gupta ............... G06F 12/00 |
| 9,383,926 | B2* | 7/2016 | Law ............... G06F 3/0611 |
| 9,652,391 | B2* | 5/2017 | Kruckemyer ....... G06F 12/0893 |
| 9,690,716 | B2* | 6/2017 | Li ............... G06F 12/1045 |
| 9,836,232 | B1* | 12/2017 | Vasquez ............... G06F 3/0613 |
| 9,886,210 | B2* | 2/2018 | Frank ............... G06F 3/0613 |
| 9,977,758 | B1* | 5/2018 | Schumacher ....... G06F 13/4221 |
| 10,002,077 | B2* | 6/2018 | Zuckerman ........... G06F 9/526 |
| 2002/0194558 | A1 | 12/2002 | Wang et al. |
| 2005/0015646 | A1 | 1/2005 | Okada et al. |
| 2005/0125456 | A1 | 6/2005 | Hara et al. |
| 2005/0262306 | A1 | 11/2005 | Nenov et al. |
| 2006/0026339 | A1 | 2/2006 | Rostampour |
| 2007/0220306 | A1 | 9/2007 | Childs et al. |
| 2008/0109629 | A1 | 5/2008 | Karamcheti et al. |
| 2009/0164696 | A1 | 6/2009 | Allen et al. |
| 2009/0198873 | A1* | 8/2009 | Tzeng ............... G06F 12/0246 711/103 |
| 2011/0153908 | A1 | 6/2011 | Schaefer et al. |
| 2012/0054746 | A1 | 3/2012 | Vaghani et al. |
| 2012/0079170 | A1 | 3/2012 | Chang et al. |
| 2012/0290785 | A1 | 11/2012 | Ergan et al. |
| 2012/0297147 | A1 | 11/2012 | Mylly et al. |
| 2012/0303686 | A1* | 11/2012 | Ananthanarayanan ............... G06F 16/1858 707/827 |
| 2012/0317348 | A1* | 12/2012 | Tzeng ............... G06F 12/0246 711/103 |
| 2012/0317385 | A1 | 12/2012 | Driever et al. |
| 2013/0036128 | A1 | 2/2013 | Ben-tsion et al. |
| 2013/0111103 | A1 | 5/2013 | Dodson et al. |
| 2013/0185503 | A1 | 7/2013 | Bhatta |
| 2013/0275661 | A1 | 10/2013 | Zimmer et al. |
| 2014/0297935 | A1 | 10/2014 | Post et al. |
| 2014/0297938 | A1 | 10/2014 | Puthiyedath et al. |
| 2015/0012690 | A1* | 1/2015 | Bruce ............... G06F 12/0811 711/103 |
| 2015/0081644 | A1 | 3/2015 | Pitts |
| 2015/0081998 | A1 | 3/2015 | Post et al. |
| 2015/0253994 | A1 | 9/2015 | Takada et al. |
| 2015/0331677 | A1 | 11/2015 | Kimura |
| 2016/0342341 | A1 | 11/2016 | Voigt et al. |
| 2017/0329554 | A1* | 11/2017 | Voigt ............... G06F 11/00 |
| 2018/0074715 | A1 | 3/2018 | Farmahini-Farahani et al. |

FOREIGN PATENT DOCUMENTS

| | | |
|---|---|---|
| CN | 102804152 A | 11/2012 |
| EP | 2246786 A1 | 11/2010 |
| WO | WO-2013048451 A1 | 4/2013 |
| WO | WO-2013048490 A1 | 4/2013 |
| WO | WO-2013055312 A1 | 4/2013 |
| WO | 2014/100546 A1 | 6/2014 |

OTHER PUBLICATIONS

Eliminating Periodic Flush Overhead of File I/O with Non-Volatile Buffer Cache; Lee at al.; IEEE Transactions on Computers, vol. 65, iss. 4, pp. 1145-1157; Aug. 19, 2014 (Year: 2014).*
RAF: A Random Access First Cache Management to Improve SSD-Based Disk Cache; Liu et al.; Fifth International Conference on Networking, Architecture, and Storage; Jul. 15-17, 2010 (Year: 2010).*
Cache, cache everywhere, flushing all hits down the sink: On exclusivity in multilevel, hybrid caches; Appuswamy et al.; 29th Symposium on Mass Storage Systems and Technologies; May 6-10, 2013 (Year: 2013).*
Coburn, J. et al., "NV-Heaps: Making Persistent Objects Fast and Safe with Next-Generation, Non-Volatile Memories," (Research Paper), Mar. 5-11, 2011, 13 pages, available at http://cseweb.ucsd.edu/~swanson/papers/Asplos2011NVHeaps.pdf.
Elinux.org, "Application Init Optimizations," (Web Page), May 13, 2009, 5 pages, available at http://elinux.org/Application_Init_Optimizations.
Fusionio.com, "ioMemory Virtual Storage Layer (VSL)," (Web Page), Mar. 25, 2011, 3 pages, available at http://www.fusionio.com/overviews/vsi-technical-overview/.
International Search Report & Written Opinion received in PCT Application No. PCT/US2014/019586, dated Oct. 30, 2014, 9 pages.
International Search Report & Written Opinion received in PCT Application No. PCT/US2015/022946, dated Feb. 23, 2016, 12 pages.
International Search Report & Written Opinion received in PCT Application No. PCT/US2015/024159, dated Feb. 23, 2016, 10 pages.
Rudoff, A., "Programming Models for Emerging Non-volatile Memory (NVM) Technologies," (Research Paper), Usenix.org, vol. 38, No. 3, Jun. 2013, 6 pages, available at https://www.usenix.org/system/files/login/articles/08_rudoff_040-045_final.pdf.
VMware, Inc., "Understanding Memory Resource Management in VMware® ESXT™ Server," (Research Paper), White Paper, Dec. 15, 2002, 20 pages, available at http://www.vmware.com/files/pdf/perf-vsphere-memory_management.pdf.
International Preliminary Report on Patentability received for PCT Patent Application No. PCT/US2015/024159, dated Oct. 12, 2017, 7 pages.
International Preliminary Report on Patentability received for PCT Patent Application No. PCT/US2015/022946, dated Oct. 12, 2017, 9 pages.
"Filesystem in Userspace," Dec. 28, 2013, <https://web.archive.org/web/20131228094545/http://fuse.sourceforge.net/>, 3 pages.
Brouwer, A., "MMAP(2)," Dec. 31, 2013, Linux Programmer's Manual, <https://web.archive.org/web/20131231045436/http://man7.org/linux/man-pages/man2/mmap.2.html>.
die.net, "mmap(2)—Linux man page," Dec. 4, 2013, <https://web.archive.org/web/20131204082903/https://linux.die.net/man/2/mmap>.
International Preliminary Report on Patentability received in PCT Application No. PCT/US2014/019586, dated Sep. 15, 2016, 6 pages.
Mark Nielsen, "How to use a Ramdisk for Linux," Nov. 1, 1999, <http://www.linuxfocus.org/English/November1999/article124.html>.
Schoeb, L., "Why is persistent cache important?" Jul. 10, 2013, SearchStorage.com, https://searchstorage.techtarget.com/answer/Why-is-persistent-cache-important?vgnextfmt=print.

(56) References Cited

OTHER PUBLICATIONS

SNIA, "NVM Programming Model (NPM)," Dec. 21, 2013, Version 1, <https://www.snia.org/sites/default/files/NVMProgrammingModel_v1.pdf>.

Wikipedia, "mmap," Dec. 16, 2013, <https://en.wikipedia.org/w/index.php?title=Mmap&oldid=586402456>.

Zbr, "Pure in-memory cache VS persistent cache?," Feb. 13, 2013, ioremap.net, <http://www.ioremap.net/2013/02/13/pure-in-memory-cache-vs-persistent-cache/>.

Appuswamy et al., "Cache, Cache Everywhere, Flushing All Hits Down the Sink: On Exclusivity in Multilevel, Hybrid Caches", IEEE, 2013, 14 pages.

Lee et al., "Eliminating Periodic Flush Overhead of File I/O with Non-Volatile Buffer Cache", IEEE Transactions on Computers, vol. 65, No. 4, Aug. 18, 2014, pp. 1145-1157.

Libfuse, "Warning: Unresolved Security Issue", available online at <https://web.archive.org/web/20170104054750/https://github.com/libfuse/libfuse>, Jan. 4, 2017, 3 pages.

\* cited by examiner

PAGE CACHE ON PERSISTENT MEMORY

BACKGROUND

Various memory-based technologies are utilized to improve the speed at which files can be accessed from a file system. For instance, using memory mapping to provide access to a file permits an application to access the mapped portions of the file as if they are in primary memory, which can improve input/output (I/O) performance when accessing the file, especially when the file is large in size.

BRIEF DESCRIPTION OF THE DRAWINGS

Certain examples are described in the following detailed description in reference to the following drawings.

DETAILED DESCRIPTION

Figure 1:
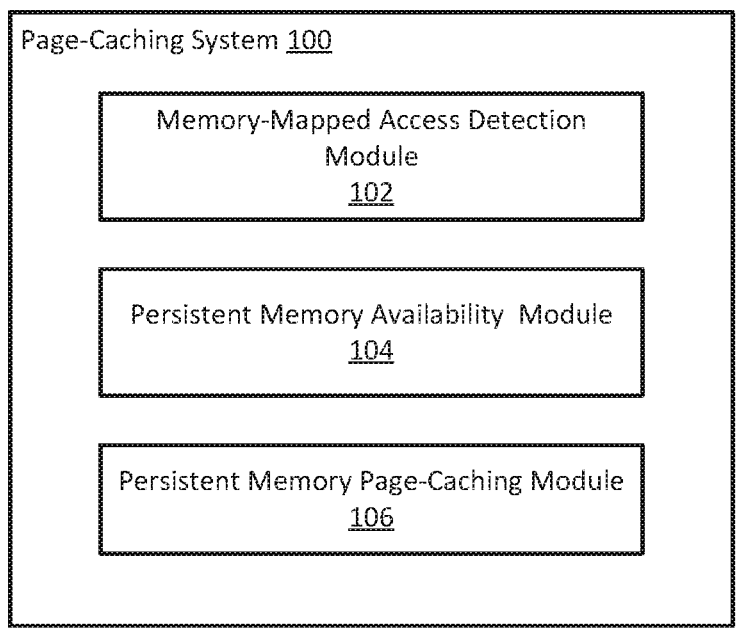
FIGS. 1 and 2 illustrate example page-caching systems for page caching using persistent memory during memory-mapped access of a file.

Though traditional uses of memory-based technologies can improve access to files on file systems, they also have their drawbacks. For instance, using Non-volatile memory (NVM) to improve memory-mapped access of file generally requires an application be modified to synchronize or flush writes to NVM, or requires the application use libraries to do so. With respect to using memory mapping to access files, various data storage devices do not permit direct memory mapping and achieve the memory mapping by allocating volatile memory (e.g., dynamic random access memory [DRAM]) and synchronizing data to non-volatile data storage (e.g., hard-disk drive or solid-state drive). Use of the volatile memory for page caching usually leads to repeated writes of page data from the volatile memory to non-volatile data storage, partially due to the lack of data persistent on volatile memory (e.g., when the volatile memory is no longer powered, page data thereon is lost).

Various examples described herein provide use of persistent memory for page-caching during memory-mapped access of a file stored on and accessed from a non-persistent memory file system or a remote file system. According to some examples, when a file is determined to have been memory-mapped while it is being accessed from a non-persistent memory file system or a remote file system, persistent memory is utilized for caching a page involved in the memory-mapped access of the file. In this way, various examples use memory-mapping of a file as a trigger for selecting persistent memory to page cache a portion of the file when the file is stored on and accessed from a non-persistent memory file system, such as a hard-disk drive-based file system, or a remote file system, such as a file system (e.g., persistent or non-persistent memory file system) accessed over a communications network.

In some examples, a memory-mapped access of a file from a non-persistent memory file system or a remote file system having a non-persistent memory page cache is detected, availability of persistent memory for caching a page in association with the memory-mapped access is determined, and based on this availability, the page is cached on the persistent memory. Depending on the example, where the page is a new page and the memory-mapped access comprises a request to cache the new page in association with the memory-mapped access, the page may be cached on the persistent memory in response to the request. Accordingly, the availability of the persistent memory may be determined in response to a request for caching a new page in association with the memory-mapped access of the file. Where the page may be an existing page cached on the non-persistent memory page cache and the memory-mapped access comprises a request to access the existing page in association with the memory-mapped access, the page may be cached on the persistent memory in response to the access of the page (e.g., read or written to by an application). Where the page is an existing page, caching the page may involve migrating the page from the non-persistent memory page cache to the persistent memory. Accordingly, the availability of the persistent memory may be determined in response to an existing page on the non-persistent page cache being accessed (e.g., read or written to by an application).

For some examples, the page cached on the persistent memory is flushed from the persistent memory to the non-persistent memory file system or the remote file system from where the file is accessed. Additionally, for some examples, a page cached on persistent memory in association with memory-mapped access of a file may be flushed when the persistent memory experiences resource pressure (e.g., lack of data storage space), when the memory-mapped access of the file is disestablished (e.g., un-mapped), when the file is closed, or when it is determined (e.g., by the computer system including the persistent memory) that other uses of the persistent memory would provide an operational advantage over using it for page caching. Additionally, for some examples, persistent memory may be utilized for page caching in place of, or in addition, to a non-persistent memory page cache, which may be based on volatile memory (e.g., DRAM).

Unlike a page cache based on volatile memory (e.g., dynamic random access memory [DRAM]) used by traditional memory-mapping, persistent memory is non-volatile and, as such, a page cached on persistent memory inherently gains persistence while avoiding, reducing, or at least delaying the need to write (e.g., flush) the cached page (e.g., by way of an msync system call) back to a non-persistent memory storage device (e.g., hard-disk drive or solid-state drive) or a remote file system. By avoiding, reducing, or delaying the need to write a cached page to the non-persistent memory storage device, memory-mapped access to a file can be accelerated and wear on a store device (e.g., solid-state drive [SSD]) underlying a non-persistent memory device or a remote file system can be reduced.

As used herein, persistent memory may include a persistent memory device, such as a phase change memory (PCM) device. As used herein, a non-persistent memory file system can include a file system that is implemented using a non-persistent memory device, such as a hard disk drive (HDD), a solid-state drive (SSD), or some other non-volatile memory device, and that is capable of providing memory-mapped access to a file stored thereon using a non-persistent memory page cache. As used herein, access of a file can include reading data from or writing data to a portion of the file.

As also used herein, a remote file system may be one accessible by a first computer system over a communications network and through a second computer system that maintains the remote file system. A remote file system may be associated with (e.g., implemented using) a persistent memory device or a non-persistent memory device, which may be local to the second computer system. For various examples, the first computer system utilizes a page-caching technique described herein when using memory mapping to access a file stored on the remote file system.

The following describes an example page-caching system in the context of an example life cycle of a particular file. The example life cycle may begin with the particular file being stored on a non-persistent memory file system or a remote file system, and the particular file being accessed (e.g., opened) from the non-persistent memory file system or the remote file system (e.g., by an application). The non-persistent memory file system or the remote file system may include a file system capable of providing memory-mapped access to a file using a non-persistent memory page cache. For the example page-caching system, when memory-mapped access of the particular file is detected, the page-caching system determines availability of persistent memory for caching a page in association with the memory-mapped access (e.g., availability of data storage space on the persistent memory for page caching) and, based on the availability, caches the page on the persistent memory. The determination of availability of the persistent memory and caching of the page may be in response to a request to cache a new page generated in association with the memory-mapped access, or in response to an existing page on the non-persistent memory page cache being accessed.

Accordingly, where the particular file is opened and the persistent memory is available at the time a new page needs to be cached in association with the memory-mapped access of the particular file (e.g., using a mmap system call), the example page-caching system may cache the new page on the persistent memory. Where the persistent memory is not available at the time, the example page-caching system may cache the new page on the non-persistent memory page cache. Where the persistent memory becomes available after an existing page has been cached on the non-persistent memory page cache in association with the memory-mapped access of the particular file, the example page-caching system may migrate the existing page from the non-persistent memory page cache to the persistent memory. This existing page may be migrated to the persistent memory after or upon subsequent access of the existing page (e.g., access virtual memory area claimed by a previous mmap request involving the non-persistent memory page cache). Migrating the existing page from the non-persistent memory page cache to the persistent memory may involve copying the page from the non-persistent memory page cache to the persistent memory, and then removing the page from the non-persistent memory page cache.

After a page has been cached on the persistent memory, the page can be accessed from the persistent memory through a direct memory-mapping with the persistent memory, where a memory address can be directly mapped to a location on the persistent memory device where the page is stored. Such a direct mapping can permit (e.g., an application to) access to the page using load (e.g., ld) and store (e.g., st) machine code instructions of a processor (e.g., central processing unit [CPU]), and can also permit access to the page with no need of a non-persistent memory page cache (thereby avoiding drawbacks associated therewith).

The following provides a detailed description of the examples illustrated by FIGS. 1-7.

FIG. 1 illustrates an example page-caching system 100 for page caching using persistent memory during memory-mapped access of a file. As shown, the page-caching system 100 includes a memory-mapped access detection module 102, a persistent memory availability module 104, and a persistent memory page-caching module 106. Depending on the example, the page-caching system 100 may be part of a computer system, such as a desktop, laptop, hand-held computing device (e.g., personal digital assistants, smartphones, tablets, etc.), workstation, server, or other device that includes a processor. In various examples, the components or the arrangement of components in the page-caching system 100 may differ from what is depicted in FIG. 1.

As used herein, modules and other components of various examples may comprise, in whole or in part, machine-readable instructions or electronic circuitry. For instance, a module may comprise computer-readable instructions executable by a processor to perform one or more functions in accordance with various examples described herein. Likewise, in another instance, a module may comprise electronic circuitry to perform one or more functions in accordance with various examples described herein. The elements of a module may be combined in a single package, maintained in several packages, or maintained separately.

The memory-mapped access detection module 102 may facilitate detecting memory-mapped access of a file, by a computer system, from a non-persistent memory file system, or remote file system, having a non-persistent memory page cache. For various examples, the non-persistent memory page cache assists in the non-persistent memory file system providing memory-mapped access to a file stored thereon. The computer system may initiate memory-mapped access of the file by opening the file and establishing memory-mapped access of the file, which can result in a new page being allocated in association with the memory-mapped access. The memory-mapped access detected by memory-mapped access detection module 102 may comprise the computer system establishing a new memory-mapping of the file, or the computer system requesting access to a memory address (e.g., virtual memory address) of a page stored on a non-persistent memory page cache and associated with an existing (e.g., previously established) memory mapping.

The persistent memory availability module 104 may facilitate determining availability of persistent memory, on a computer system, for page caching. For some examples, the persistent memory availability module 104 determines availability of persistent memory prior to caching a page, associated with memory-mapped access of a file, on the persistent memory. Depending on the example, the persistent memory availability module 104 may determine availability of the persistent memory in response to a request to cache a new page in association with the memory-mapped access, or in response to an existing page on the non-persistent memory page cache being accessed in association with the memory-mapped access.

Depending on the example, the availability of persistent memory for caching a page in association with the memory-mapped access may be based on whether the persistent memory is present on the computer system. The availability of persistent memory for caching a page in association with the memory-mapped access may be based on whether the persistent memory is enabled for page caching (e.g., persistent memory may be disabled for page caching but enabled for long-term file storage). Additionally, the availability of persistent memory for caching a page in association with the memory-mapped access may be based on whether the persistent memory possess available data storage space to cache a page associated with the memory-mapped access of the file.

The persistent memory page-caching module 106 may facilitate caching a page, associated with memory-mapped access of a file, on persistent memory of a computer system. Where the page is a new page and the memory-mapped access comprises a request to cache the new page in association with the memory-mapped access, the persistent memory page-caching module 106 may cache the page on the persistent memory in response to the request. Where the page is an existing page and the memory-mapped access comprises accessing the existing page in association with the memory-mapped access, the persistent memory page-caching module 106 may cache the page on the persistent memory in response to the existing page being accessed (e.g., by an application).

For some examples, the page may constitute at least a portion, if not all, of the file being accessed via the memory-mapped access. Where the file is opened by the computer system, the file is memory-mapped by the computer system, and persistent memory is determined to be available (e.g., by the persistent memory availability module 104), when a new page needs to be cached in association with the memory mapping (e.g., as a result using a mmap system call), the persistent memory page-caching module 106 may cause the new page to be cached on the persistent memory. Where the persistent memory is determined not to be available when a new page needs to be cached, the persistent memory page-caching module 106 may cause the new page to be cached on a non-persistent memory page cache of the computer system. Where the persistent memory is determined to be available after an existing page has been cached on a non-persistent memory page cache of the computer system, the persistent memory page-caching module 106 may cause the existing page to migrate from the non-persistent memory page cache to the persistent memory. The persistent memory page-caching module 106 may cause this migration after or upon subsequent access of the existing page (e.g., access virtual memory area claimed by a previous mmap request involving the non-persistent memory page cache). As described herein, migrating the existing page from the non-persistent memory page cache to the persistent memory may involve copying the page from the non-persistent memory page cache to the persistent memory, and then removing the page from the non-persistent memory page cache.

Figure 2:
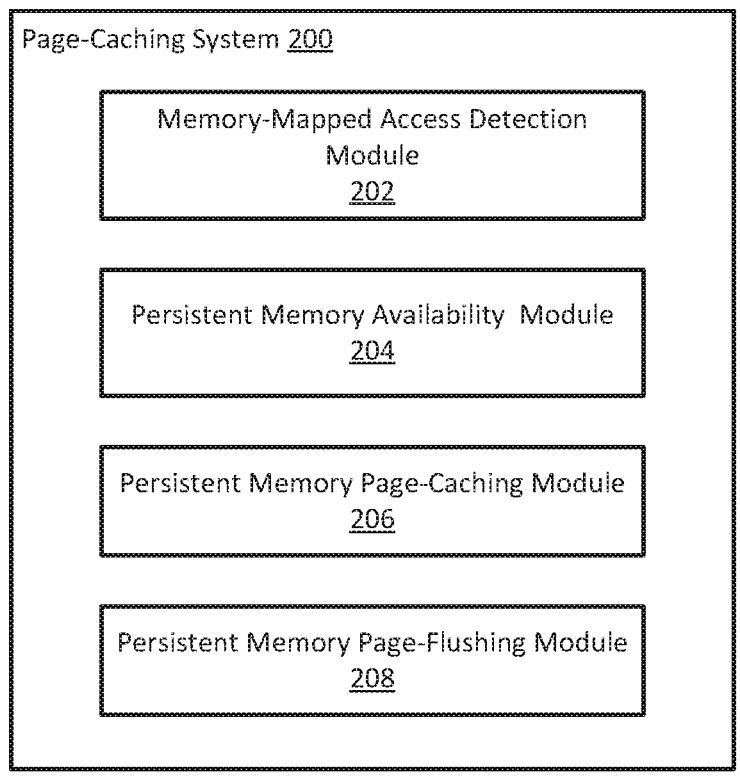

FIG. 2 illustrates an example page-caching system 200 for page caching using persistent memory during memory-mapped access of a file. As shown, the page-caching system 200 includes a memory-mapped access detection module 202, a persistent memory availability module 204, a persistent memory page-caching module 206, and a persistent memory page-flushing module 208. Depending on the example, the page-caching system 200 may be part of a computer system, such as a desktop, laptop, hand-held computing device (e.g., personal digital assistants, smartphones, tablets, etc.), workstation, server or other device that includes a processor. In various examples, the components or the arrangement of components in the page-caching system 200 may differ from what is depicted in FIG. 2.

The memory-mapped access detection module 202, the persistent memory availability module 204, and the persistent memory page-caching module 206 may be respectively similar to the memory-mapped access detection module 102, the persistent memory availability module 104, and the persistent memory page-caching module 106 described above with respect to the page-caching system 100 of FIG. 1.

The persistent memory page-flushing module 208 may facilitate flushing a page from the persistent memory to a non-persistent memory file system, where the flushing may be based on a set of criteria. The page may be one previously cached on the persistent memory by the persistent memory page-caching module 206. As described herein, the persistent memory page-caching module 206 may have cached the page on the persistent memory in response to the memory-mapped access detection module 202 detecting memory-mapped access of a file, where the page is associated with the memory-mapped access. As also described herein, the persistent memory page-caching module 206 may have cached the page on the persistent memory based on availability of the persistent memory as determined by the persistent memory availability module 204.

Depending on the example, the set of criteria for flushing the page may include a criterion relating to a condition of the memory-mapped access, such as whether the memory-mapped access has been disestablished (e.g., unmapped), frequency of use of the memory-mapped access, or data storage space of the persistent memory utilized for the memory-mapped access. For instance, the persistent memory page-flushing module 208 may cause the page to be flushed from the persistent memory to the non-persistent memory file system when the memory-mapped access of the file is disestablished, which may occur when the computer system explicitly executes an un-mapping system call. The set of criteria may include a criterion relating to whether the file associated with the memory-mapped access has been closed by the computer system. For example, the persistent memory page-flushing module 208 may cause the page to be flushed from the persistent memory to the non-persistent memory file system upon the computer system closing the file, where such closure may be detected by the persistent memory page-flushing module 208. Additionally, the set of criteria may include a criterion relating to a condition of the persistent memory. For instance, the persistent memory page-flushing module 208 may cause the page to be flushed from the persistent memory to the non-persistent memory file system when availability of the persistent memory is determined (e.g., by the persistent memory availability module 204) to be limited or exhausted. In another instance, the persistent memory page-flushing module 208 may cause the page to be flushed from the persistent memory to the non-persistent memory file system when it is determined (e.g., by the persistent memory page-flushing module 208) that data store space occupied on the persistent memory by the page may be better utilized for another use on the computer system. The better utilization of the persistent memory may include any alternative use of the persistent memory that would provide an operational advantage over using it to specifically cache the page to be flushed, or over using it for page caching in general. Examples of alternative utilizations may include long term storage of a file (e.g., the file associated with the memory-mapped access), caching of a new page (e.g., associated with the memory-mapped access), caching of an existing page currently on the non-persistent memory page cache, or caching of a page associated with a higher priority memory-mapped access.

Figure 3:
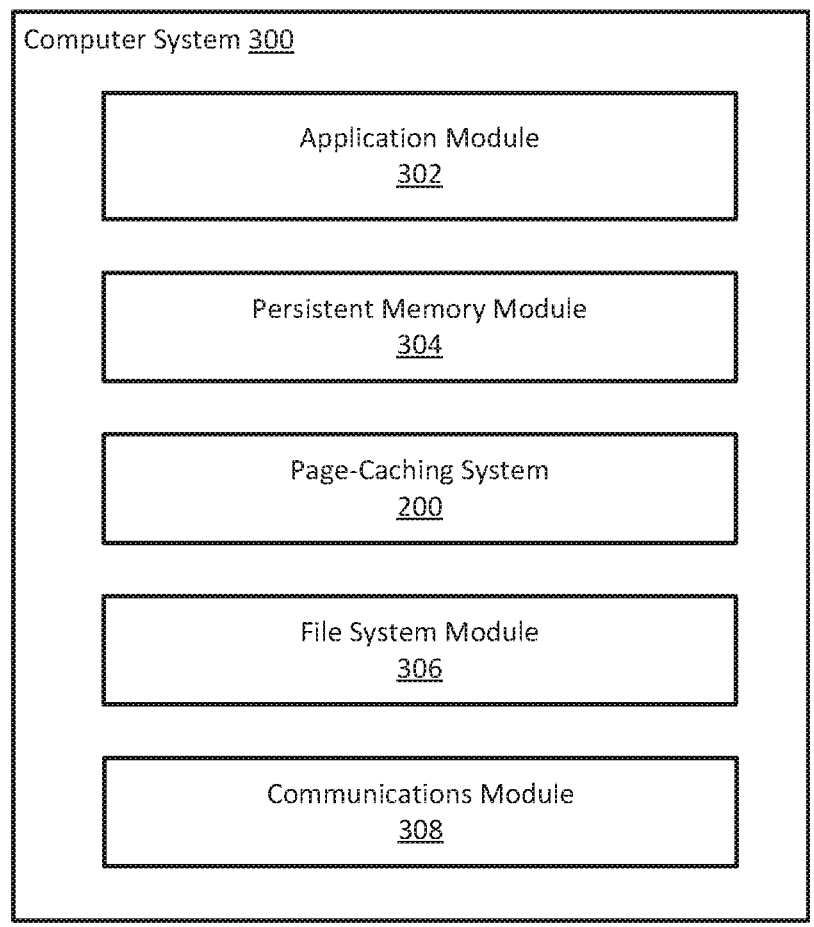
FIG. 3 illustrates an example computer system including an example page-caching system.

FIG. 3 illustrates an example computer system 300 including the page-caching system 100. The computer system 300 may be any computing device having a processor and memory, such as a desktop, laptop, hand-held computing device (e.g., personal digital assistants, smartphones, tablets, etc.), workstation, server, or other device that includes a processor. As shown, the computer system 300 includes an application module 302, a persistent memory module 304, the page-caching system 200, a file system module 306, and a communications module 308. In various examples, the components or the arrangement of components in the computer system 300 may differ from what is depicted in FIG. 3.

The application module 302 represents any firmware or software (e.g., software application or operating system) operable on the computer system 300 and capable of accessing (e.g., read from, write to, or modify) a file stored on a file system. For some examples, the application module 302 opens a file from a file system when the application module 302 wishes to access the file and, eventually, may close the file once the application module 302 has completed its access of the file. When the application module 302 accesses a file from a non-persistent memory file system or a remote file system, the file may be memory-mapped using a non-persistent memory page cache (e.g., based on volatile memory) included by the computer system 300 (not shown).

The persistent memory module 304 may comprise persistent memory to store a page. The page may be a new page cached on the persistent memory by the page-caching system 200, or one migrated by the page-caching system 200 to the persistent memory from a non-persistent memory page cache included by the computer system 300.

The file system module 306 may provide the application module 302 with access to a local non-persistent memory file system of the computer system 300, or with access to a remote file system that is remote with respect to the computer system 300. The local non-persistent memory file system of the computer system 300 may include a file system that is implemented using a non-persistent memory device (e.g., a hard disk drive [HDD] or a solid-state drive [SSD]) local to the computer system 300, and that is capable of providing memory-mapped access to a file stored thereon using a non-persistent memory page cache of the computer system 300. The remote file system may be a file system that is maintained by another computer system with which the computer system 300 can communicate (e.g., over a communications network), and that is capable providing memory-mapped access to a file stored thereon using a non-persistent memory page cache of the computer system 300. The file system of the remote file system may be associated with a non-persistent memory device or a persistent memory device accessible by the other computer system.

The page-caching system 200 facilitates various operations described herein on the computer system 300. For instance, the page-caching system 200 may detect memory-mapped access of a file by the application module 302, from a local non-persistent memory file system of the computer system 300 or a remote file system, through the file system module 306. In response, the page-caching system 200 may determine availability of the persistent memory of the computer system 300 accessible through the persistent memory module 304. Based on this determination, the page-caching system 200 may cache a page, associated with the memory-mapped access, on the persistent memory of the computer system 300. As described herein, caching the page may involve caching a new page associated with the memory-mapped access on the persistent memory of the computer system 300, or migrating a page existing on a non-persistent memory page cache of the computer system 300 to the persistent memory. Eventually, based on a set of criteria, the page-caching system 200 may flush a page from the persistent memory of the computer system 300 to the non-persistent memory file system or the remote file system from which the file is being accessed by the computer system 300.

For some examples, the file system module 306 may include a virtual file system module that facilitates the page-caching system 200 caching a page on persistent memory of the computer system 300. The virtual file system may provide the application module 302 with a virtual file system having a single file namespace but being associated with (e.g., based on) a plurality of separate file systems of similar (e.g., two or more non-persistent memory file systems) or different types (e.g., a non-persistent memory file system and a persistent memory file system).

The communications module 308 may facilitate communication of the computer system 300 with another computer system over a communications network that that permits data communication. The communications network may comprise one or more local or wide-area communications networks, such as the Internet, WiFi networks, cellular networks, private networks, public networks, and the like. As described herein, the computer system 300 may access a remote file system maintained by another computer system, and the communications module 308 may facilitate the exchange of network data packets between the computer system 300 and the other computer system that facilitate the access.

Figure 4:
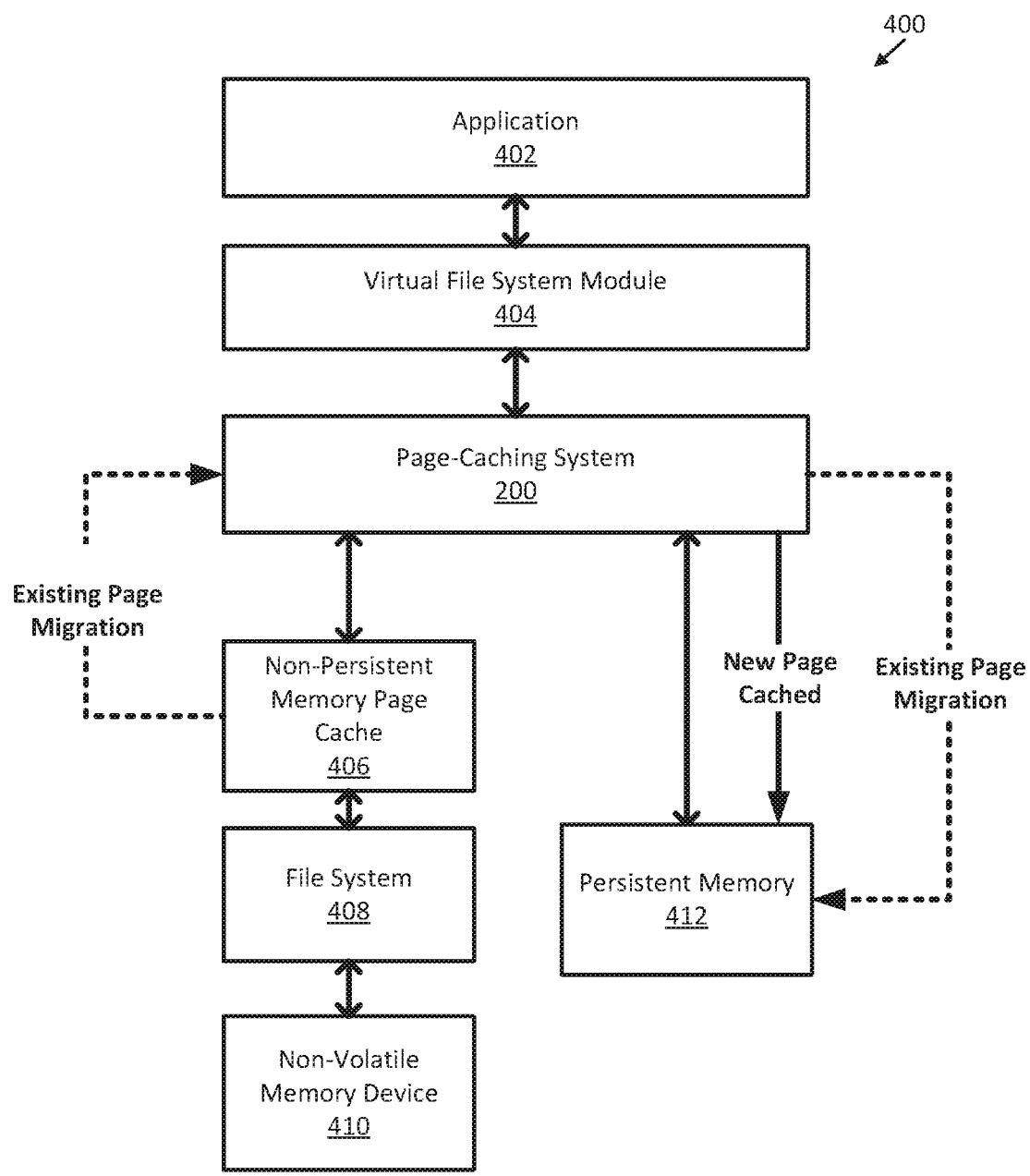
FIG. 4 illustrates example data flow in an example computing environment that includes an example page-caching system.

FIG. 4 illustrates example data flow in an example computing environment 400 that includes the page-caching system 200. As shown, the computing environment 400 includes an application 402, a virtual file system module 404, the page-caching system 200, a non-persistent memory page cache 406, a file system 408, a non-volatile memory device 410, and persistent memory 412. According to some examples, the virtual file system module 404 provides the application 402 with a virtual file system having a single file namespace based at least on the file system 408, which is associated with the non-volatile memory device 410. The non-persistent memory page cache 406 may support memory-mapped access, by the application 402, of files stored on the file system 408.

During an operation in the computing environment 400, the application 402 may open and access a given file stored on the file system 408 and provided by the virtual file system module 404 as part of a single name space. When the given file is accessed by the application 402 through the virtual file system module 404, the given file may be memory-mapped. The page-caching system 200 may detect the memory-mapped access of the given file and, in response, determine availability of the persistent memory 412 for caching a page in association with the memory-mapped access of the given file. Where the page-caching system 200 determines that the persistent memory 412 is available, the page-caching system 200 may cache the page on the persistent memory 412. Where the page-caching system 200 determines that the persistent memory 412 is available, the page-caching system 200 may cache the page on the non-persistent memory page cache 406.

As described herein, where the memory-mapped access detected by the page-caching system 200 comprises a request to cache a new page in association with the memory-mapped access, the new page may be cached to the persistent memory 412 and the application 402 may access the new page from the persistent memory 412 via a direct memory mapping to the persistent memory 412 (as illustrated in FIG. 4). Where the memory-mapped access detected by the page-caching system 200 comprises a request (e.g., by the application 402) to access an existing page on the non-persistent memory page cache 406, the page-caching system 200 may cache the existing page on the persistent memory 412, and may do so by migrating the existing page from the non-persistent memory page cache 406 to the persistent memory 412 (as illustrated in FIG. 4). After the existing page has been migrated to the persistent memory 412, the existing page may be accessed (e.g., by the application 402) via a direct memory mapping to the persistent memory 412. Eventually, based on a set of criteria described herein, the page-caching system 200 may flush a page cached on the persistent memory 412 from the persistent memory 412 to the file system 408, thereby causing the page to be stored on the non-volatile memory device 410.

With respect to a computer system, the non-persistent memory page cache 406 and the persistent memory 412 may be local to the computer system. For some examples, the file system 408 is a local non-persistent memory file system of the computer system and the non-volatile memory device 410 associated with the file system 408 is also local to the computer system. For various examples, the file system 408 is a remote file system maintained by another computer system and the non-volatile memory device 410 associated with the file system 408 is remote with respect to the computer system.

Figure 5:
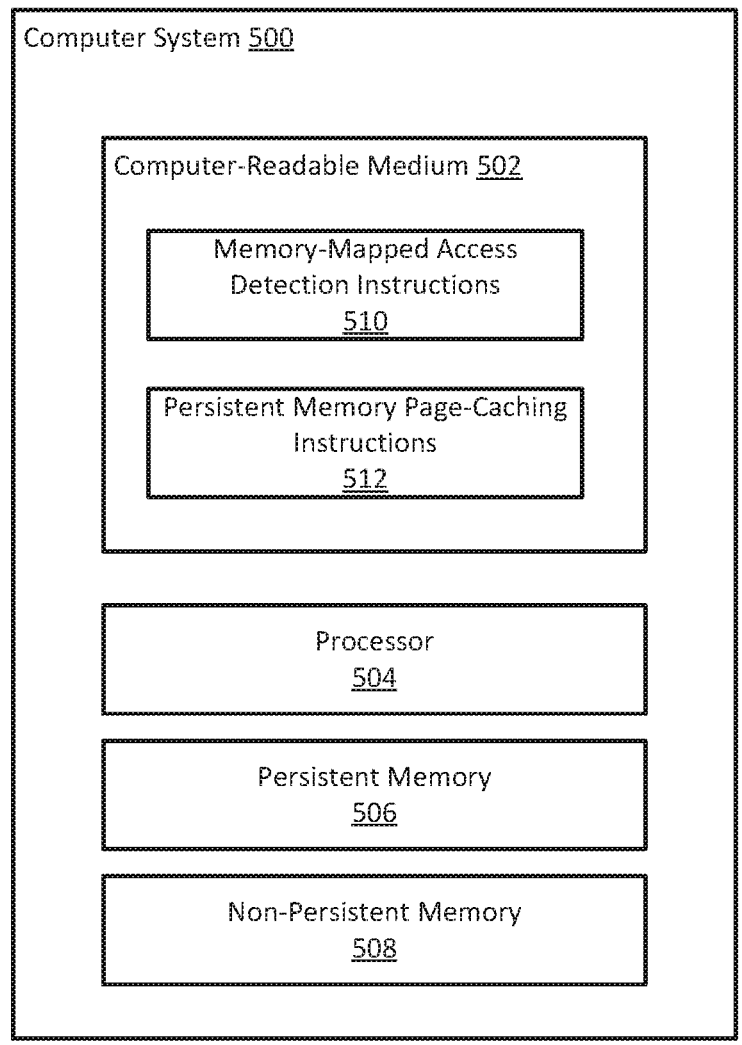
FIG. 5 illustrates an example computer system for page caching using persistent memory during memory-mapped access of a file.

FIG. 5 illustrates an example computer system 500 for page caching using persistent memory during memory-mapped access of a file. As shown, the computer system 500 includes a computer-readable medium 502, a processor 504, persistent memory 506, and non-persistent memory 508. In various examples, the components or the arrangement of components of the computer system 500 may differ from what is depicted in FIG. 5. For instance, the computer system 500 can include more or less components than those depicted in FIG. 5.

The computer-readable medium 502 may be any electronic, magnetic, optical, or other physical storage device that stores executable instructions. For example, the computer-readable medium 502 may be a Random Access Memory (RAM), an Electrically-Erasable Programmable Read-Only Memory (EEPROM), a storage drive, an optical disc, or the like. The computer-readable medium 502 can be encoded to store executable instructions that cause the processor 504 to perform operations in accordance with various examples described herein. In various examples, the computer-readable medium 502 is non-transitory. As shown in FIG. 5, the computer-readable medium 502 includes memory-mapped access detection instructions 510 and persistent memory page-caching instructions 512.

The processor 504 may be one or more central processing units (CPUs), microprocessors, or other hardware devices suitable for retrieval and execution of one or more instructions stored in the computer-readable medium 502. The processor 504 may fetch, decode, and execute the instructions 510 and 512 to enable the computer system 500 to perform operations in accordance with various examples described herein. For some examples, the processor 504 includes one or more electronic circuits comprising a number of electronic components for performing the functionality of one or more of the instructions 510 and 512.

The persistent memory 506 may include a persistent memory device, such as a phase change memory (PCM) device. In some examples, the persistent memory 506 may support a local persistent memory file system at the computer system 500, which may be provided to an application on the computer system 500 as part of a virtual file system.

The non-persistent memory 508 may include random access memory device, such as dynamic random access memory (DRAM), which may serve as the basis for a non-persistent memory page cache on the computer system 500. As described herein, a non-persistent memory page cache, based on the non-persistent memory 508, may support memory-mapped access of files from a file system (e.g., non-persistent memory file system or remote file system) accessible by the computer system 500.

The memory-mapped access detection instructions 510 may cause the processor 504 to detect memory-mapped access of a file from a remote file system having a non-persistent memory page cache. As described herein, the remote file system may be a file system maintained by a computer system remote with which the computer system 500, and memory-mapped access of files on the remote file system may be supported by a non-persistent memory page cache based on the non-persistent memory 508. The persistent memory page-caching instructions 512 may cause the processor 504 to cache a page on the persistent memory 506 based on availability of the persistent memory 506 for caching the page in association with the memory-mapped access of the file.

Figure 6:
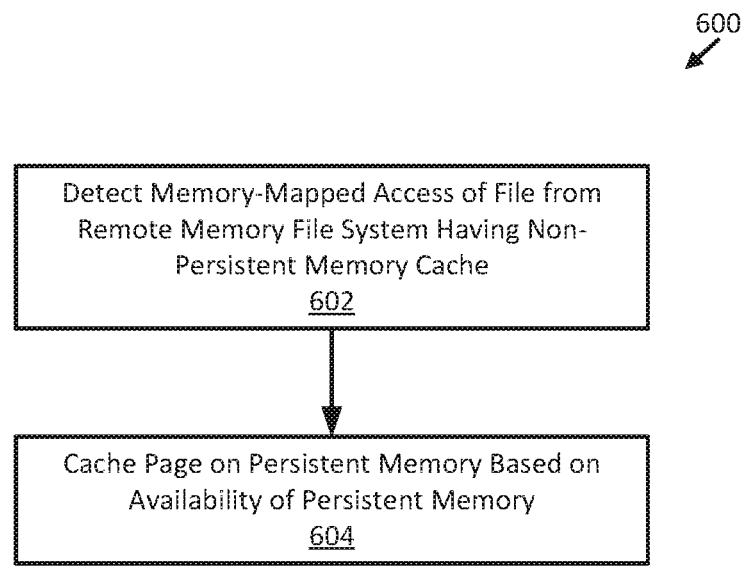
FIGS. 6 and 7 illustrate example methods performed by an example computer system to facilitate page-caching using persistent memory during memory-mapped access of a file.

FIG. 6 illustrates an example method 600 performed by an example computer system to facilitate page-caching using persistent memory during memory-mapped access of a file. Although execution of the method 600 is described below with reference to the page-caching system 100 of FIG. 1 and a computer system, execution of the method 600 by other suitable systems or devices may be possible. The method 600 may be implemented in the form of executable instructions stored on a computer-readable medium or in the form of electronic circuitry.

In FIG. 6, the method 600 begins at block 602, with the memory-mapped access detection module 102 detecting memory-mapped access of a file, by a computer system, from a remote file system having a non-persistent memory page cache. At block 604, the method 600 continues with the persistent memory page-caching module 106 caching a page, associated with the memory-mapped access of the file, on persistent memory of the computer system based on availability of the persistent memory for page caching. As described herein, for some examples, the availability of the persistent memory on the computer system is determined by the persistent memory availability module 104.

Figure 7:
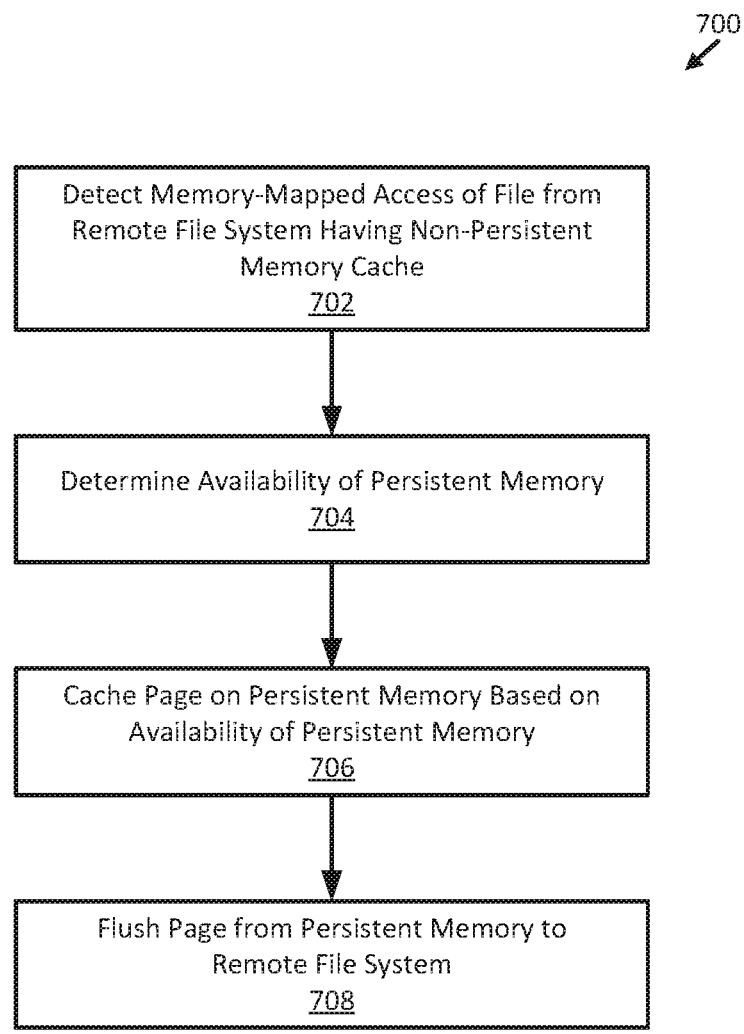

FIG. 7 illustrates an example method 700 performed by an example computer system to facilitate page-caching using persistent memory during memory-mapped access of a file. Although execution of the method 700 is described below with reference to the page-caching system 200 of FIG. 2 and a computer system, execution of the method 700 by other suitable systems or devices may be possible. The method 700 may be implemented in the form of executable instructions stored on a computer-readable medium or in the form of electronic circuitry.

In FIG. 7, the method 700 begins at block 702, with the memory-mapped access detection module 202 detecting memory-mapped access of a file, by a computer system, from a remote file system having a non-persistent memory page cache. At block 704, the method 700 continues with the persistent memory availability module 204 determining availability of persistent memory of the computer system for page caching. At block 706, the method 700 continues with the persistent memory page-caching module 206 caching a page, associated with the memory-mapped access of the file, on the persistent memory based on the availability determined at block 704. At block 708, the method 700 continues with the persistent memory page-flushing module 208 flushing the page, associated with the memory-mapped access of the file, from the persistent memory to the remote file system.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

The invention claimed is:

1. A system, comprising:
   a processor; and
   a non-transitory storage medium storing instructions executable on the processor to:
   detect a memory-mapped access of a file from a non-persistent memory file system having a non-persistent memory page cache, the memory-mapped access of the file comprising a request to access a page;
   determine availability of a persistent memory for caching the page accessed by the memory-mapped access of the file;
   cache the page accessed by the request in the persistent memory based on the availability of the persistent memory; and
   flush the page from the persistent memory to the non-persistent memory file system based on a set of criteria that includes a criterion relating to a condition of the persistent memory, wherein the flushing of the page from the persistent memory to the non-persistent memory file system is responsive to a determination by the instructions executable on the processor that a data store space of the persistent memory occupied by the page is to be used for a purpose other than caching of data.

2. The system of claim 1, wherein the page is a new page, and the request to access the page of the memory-mapped access comprises a request to cache the new page.

3. The system of claim 1, wherein the page is an existing page cached in the non-persistent memory page cache, and the request to access the page of the memory-mapped access comprises a request to access the existing page.

4. The system of claim 3, wherein caching the existing page in the persistent memory comprises migrating the existing page from the non-persistent memory page cache to the persistent memory.

5. The system of claim 1, wherein the instructions are executable on the processor to flush the page from the persistent memory to the non-persistent memory file system based on the set of criteria that further includes a criterion relating to a condition of the memory-mapped access.

6. The system of claim 1, wherein the instructions are executable on the processor to flush the page from the persistent memory to the non-persistent memory file system based on the set of criteria that further includes a criterion relating to whether the file is closed.

7. The system of claim 1, wherein the determining of the availability of the persistent memory is based on a determination that the persistent memory has been enabled for page caching.

8. The system of claim 1, wherein the non-persistent memory file system comprises:
   a file system based on a disk drive or a solid-state drive, or
   a remote file system accessible over a network.

9. A non-transitory computer readable medium comprising instructions that upon execution cause a computer system to:
   detect a memory-mapped access of a file from a non-persistent memory file system having a non-persistent memory page cache in the computer system, the memory-mapped access of the file comprising a request to access a page;
   cache the page accessed by the request in a persistent memory based on availability of the persistent memory to cache the page; and
   flush the page from the persistent memory to the non-persistent memory file system based on a set of criteria that includes a criterion relating to a condition of the persistent memory, wherein the flushing of the page from the persistent memory to the non-persistent memory file system is responsive to a determination by the instructions that a data store space of the persistent memory occupied by the page is to be used for a purpose other than caching of data.

10. The non-transitory computer readable medium of claim 9, wherein the page is a new page, and the request to access the page of the memory-mapped access comprises a request to cache the new page.

11. The non-transitory computer readable medium of claim 9, wherein the page is an existing page cached in the non-persistent memory page cache, and the request to access the page of the memory-mapped access comprises a request to access the existing page.

12. The non-transitory computer readable medium of claim 9, wherein the non-persistent memory file system comprises:
    a file system based on a disk drive or a solid-state drive, or
    a remote file system accessible over a network.

13. A method, comprising:
    detecting, by a computer system, a memory-mapped access of a file over a network from a remote file system having a non-persistent memory page cache, the memory-mapped access of the file comprising a request to access a page;
    caching, by the computer system, the page accessed by the request in a persistent memory based on availability of the persistent memory for caching the page; and
    flushing, by the computer system, the page from the persistent memory to the remote file system over the network based on a set of criteria that includes a criterion relating to a condition relating to un-mapping of the file, and the flushing of the page from the persistent memory to the remote file system over the network is responsive to an un-mapping system call to un-map the file.

14. The method of claim 13, comprising determining, by the computer system, the availability of the persistent memory based on a determination that the persistent memory has been enabled for page caching.

15. The method of claim 13, comprising flushing, by the computer system, the page from the persistent memory to the remote file system over the network based on the set of criteria that includes a criterion relating to whether the file is closed.

16. The method of claim 13, comprising flushing, by the computer system, the page from the persistent memory to the remote file system over the network based on the set of criteria that further includes a criterion relating to a condition of the persistent memory.

17. The system of claim 1, wherein the page is part of the file accessed by the memory-mapped access of the file.

18. A system, comprising:
   a processor; and
   a non-transitory storage medium storing instructions executable on the processor to:
      detect a memory-mapped access of a file from a non-persistent memory file system having a non-persistent memory page cache, the memory-mapped access of the file comprising a request to access a page;
      determine availability of a persistent memory for caching the page accessed by the memory-mapped access of the file;
      cache the page accessed by the request in the persistent memory based on the availability of the persistent memory; and
      flush the page from the persistent memory to the non-persistent memory file system based on a set of criteria that includes a criterion relating to a condition relating to un-mapping of the file, and the flushing of the page from the persistent memory to the non-persistent memory file system is responsive to an un-mapping system call to un-map the file.

19. The system of claim 18, wherein the non-persistent memory file system comprises:
   a file system based on a disk drive or a solid-state drive, or
   a remote file system accessible over a network.

* * * * *